(12) United States Patent
Nakajima

(10) Patent No.: US 11,451,249 B2
(45) Date of Patent: Sep. 20, 2022

(54) RADIO-FREQUENCY MODULE AND COMMUNICATION DEVICE

(71) Applicant: Murata Manufacturing Co., Ltd., Nagaokakyo (JP)

(72) Inventor: Reiji Nakajima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/239,911

(22) Filed: Apr. 26, 2021

(65) Prior Publication Data

US 2021/0384926 A1    Dec. 9, 2021

(30) Foreign Application Priority Data

Jun. 9, 2020   (JP) .............................. JP2020-100393

(51) Int. Cl.
*H04B 1/04*   (2006.01)

(52) U.S. Cl.
CPC ....... *H04B 1/04* (2013.01); *H04B 2001/0408* (2013.01)

(58) Field of Classification Search
CPC ......... H01L 21/84; H01L 23/60; H01L 24/16; H01L 25/16; H03C 1/62; H03F 1/56; H03F 3/19; H03F 3/21; H03F 3/24; H03F 3/195; H03F 2200/267; H03F 2200/294; H03F 2200/451; H04B 1/00; H04B 1/04; H04B 1/16; H04B 1/28; H04B 1/38; H04B 1/44; H04B 1/48; H04B 1/0053; H04B 1/0057; H04B 1/0475; H04B 17/00; H04B 200/0408; H04B 2001/0408; H04M 1/02; H04M 1/0277

(Continued)

(56) References Cited

U.S. PATENT DOCUMENTS

2005/0245212 A1*  11/2005  Ono ..................... H03G 3/3047
                                                                  455/127.1
2015/0303971 A1*  10/2015  Reisner ............... H01L 25/0657
                                                                  455/77

(Continued)

FOREIGN PATENT DOCUMENTS

JP       2010-041634 A      2/2010
JP       2019-176452 A      10/2019

(Continued)

OTHER PUBLICATIONS

Office Action dated Apr. 16, 2022 in Korean Patent Application No. 10-2021-0045685, 9 pages.

*Primary Examiner* — Shawkat M Ali
(74) *Attorney, Agent, or Firm* — Xsensus LLP

(57) ABSTRACT

A radio-frequency module includes a module substrate; a power amplifier; a first switch connected to an input terminal of the power amplifier; a second switch connected to an output terminal of the power amplifier; and a switch control circuit that controls the first switch and the second switch. The first switch, the second switch, and the switch control circuit are included in a semiconductor IC being integrated into a single chip. The power amplifier and the semiconductor IC are mounted on or above the module substrate. When the module substrate is viewed in a plan view, in the semiconductor IC, the switch control circuit is disposed between the first switch and the second switch.

20 Claims, 5 Drawing Sheets

(58) Field of Classification Search
USPC ........ 333/129, 132, 133; 375/262, 295–297;
455/82, 115.1, 127.1, 323, 333, 522
See application file for complete search history.

(56) References Cited

U.S. PATENT DOCUMENTS

2018/0096951 A1* 4/2018 Chen .................. H01L 23/66
2018/0131501 A1   5/2018 Little
2018/0294783 A1* 10/2018 Okabe ................ H03F 1/56

FOREIGN PATENT DOCUMENTS

| KR | 10-2006-0054090 A | 5/2006 |
| WO | 2018/088410 A1 | 5/2018 |
| WO | 2018/168500 A1 | 9/2018 |

* cited by examiner

RADIO-FREQUENCY MODULE AND COMMUNICATION DEVICE

CROSS-REFERENCE TO RELATED APPLICATION

The present application is based on and claims priority to Japanese Patent Application No. 2020-100393 filed on Jun. 9, 2020 the entire contents of which being incorporated herein by reference.

BACKGROUND

1. Field of Disclosure

The present disclosure relates to a radio-frequency module and a communication device.

2. Description of the Related Art

In mobile communication devices, such as mobile phones, in particular, the layout of circuit elements constituting a radio-frequency front-end circuit becomes complicated as multiband support progresses.

U.S. Patent Application Publication No. 2018/0131501 discloses a configuration of a front-end circuit including a power amplifier that amplifies a transmission signal. On an input side of the power amplifier, a switch is disposed that switches between input and no input of a transmission signal from a transceiver circuit to the power amplifier. This enables a transmission signal output from the transceiver circuit to be transmitted from an antenna through the front-end circuit.

However, when the front-end circuit disclosed in U.S. Patent Application Publication No. 2018/0131501 is constructed in a single small-sized radio-frequency module, a signal path on the input side of the power amplifier and a signal path on an output side come close to each other, and thus it is likely that isolation between these two signal paths deteriorates. When isolation between the above-described two signal paths deteriorates, an unwanted radio-frequency signal feedback loop is formed between an input and an output of the power amplifier. In this case, the power amplifier oscillates under certain conditions, resulting in unstable operation of the power amplifier.

SUMMARY

The present disclosure has been made to solve such issues and aims to provide a radio-frequency module and a communication device in which unstable operation of a power amplifier is suppressed and that are small-sized.

According to one aspect, the disclosure is directed to a radio frequency module including a module substrate; a power amplifier; a first switch connected to an input terminal of the power amplifier; a second switch connected to an output terminal of the power amplifier; and a switch control circuit configured to control the first switch and the second switch. The first switch, the second switch, and the switch control circuit are included in a semiconductor IC being integrated into a single chip. The power amplifier and the semiconductor IC are mounted on or above the module substrate. When the module substrate is viewed in a plan view, in the semiconductor IC, the switch control circuit is disposed between the first switch and the second switch.

The present disclosure can provide the radio-frequency module and a communication device in which unstable operation of the power amplifier is suppressed and that are small-sized.

Other features, elements, characteristics and advantages of the present disclosure will become more apparent from the following detailed description of preferred embodiments of the present disclosure with reference to the attached drawings.

DETAILED DESCRIPTION

Figure 1:
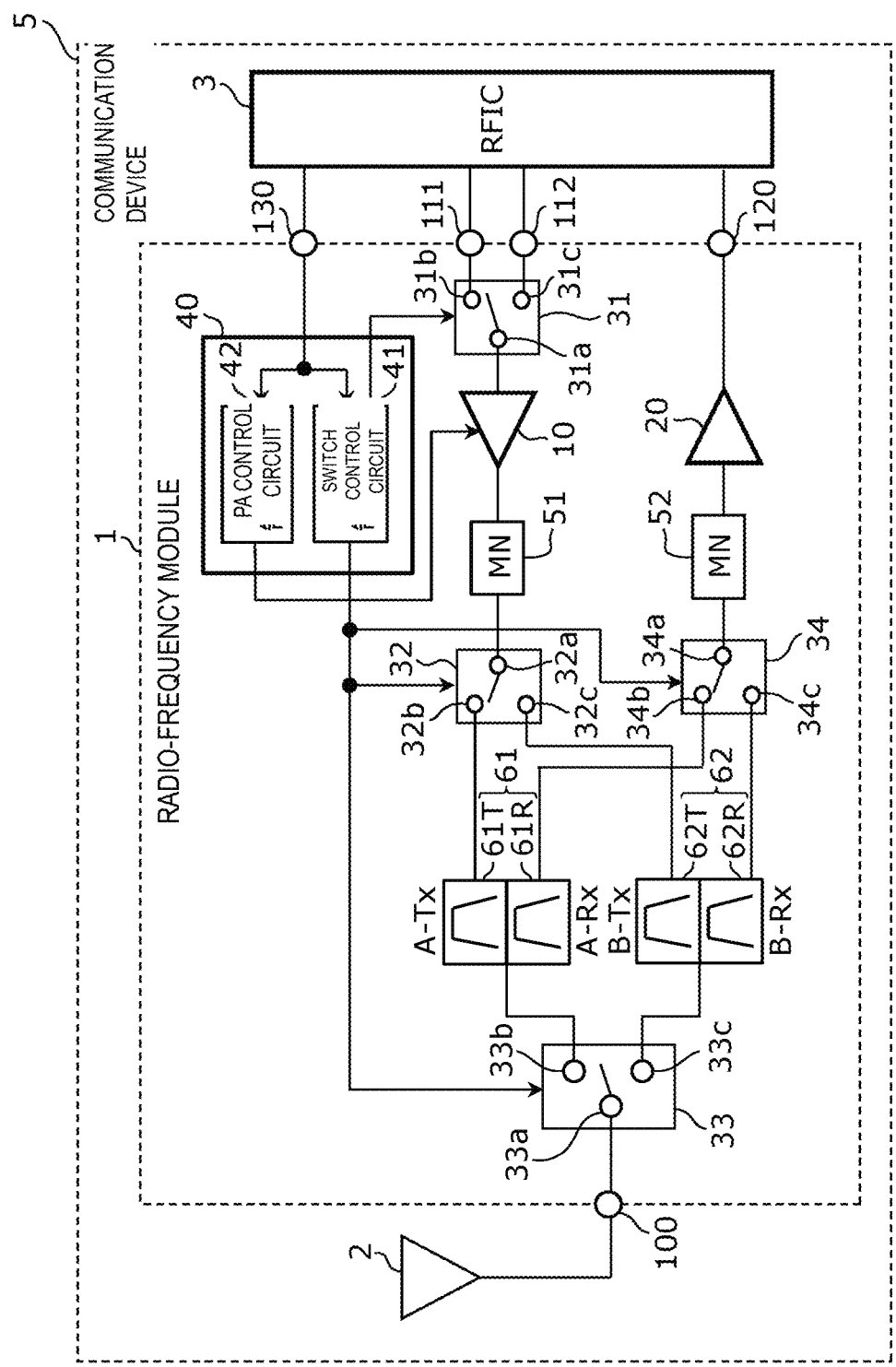
FIG. 1 illustrates a circuit configuration of a radio-frequency module and a communication device according to an embodiment.

Embodiments of the present invention will be described in detail below. Note that all of the embodiments described below describe comprehensive or specific examples. Numerical values, shapes, materials, components, the arrangement and connection configuration of the components, and so forth that are described in the following embodiments are merely examples and are not intended to limit the present invention. Of components in the following practical example and modification, a component not described in an independent claim is described as an optional component. Furthermore, the sizes or size ratio of components illustrated in drawings are or is not necessarily exact. In the figures, components that are substantially the same are denoted by the same reference numerals, and a repeated description thereof is omitted or simplified in some cases.

Furthermore, in the following description, terms, such as "parallel" and "perpendicular", representing a relationship between elements, a term, such as "rectangular", representing the shape of an element, and a numerical range refer to not only their exact meaning but also a substantially equivalent range, for example, the inclusion of a difference of about a few percent.

Furthermore, in the following description, with respect to A, B, and C mounted on or above a substrate, "when the substrate (or a main surface of the substrate) is viewed in a plan view, C is disposed between A and B" refers to the fact that, when the substrate is viewed in a plan view, at least one of a plurality of line segments connecting points within a region of A with points within a region of B passes through a region of C. Furthermore, "the substrate is viewed in a plan view" refers to the fact that the substrate and circuit elements mounted on or above the substrate that have been orthographically projected onto a plane parallel to the main surface of the substrate are viewed.

Furthermore, in the following description, "transmission path" refers to a transmission line including a line through which a radio-frequency transmission signal propagates, an electrode directly connected to the line, a terminal directly connected to the line or the electrode, and so forth. Additionally, "reception path" refers to a transmission line including a line through which a radio-frequency reception signal propagates, an electrode directly connected to the line, a terminal directly connected to the line or the electrode, and so forth. Besides, "transmission-reception path" refers to a transmission line including a line through which a radio-frequency transmission signal and a radio-frequency reception signal propagate, an electrode directly connected to the line, a terminal directly connected to the line or the electrode, and so forth.

Embodiment

1. Circuit Configuration of Radio-Frequency Module 1 and Communication Device 5

FIG. 1 illustrates a circuit configuration of a radio-frequency module 1 and a communication device 5 according to an embodiment. As illustrated in FIG. 1, the communication device 5 includes the radio-frequency module 1, an antenna 2, and a radio-frequency (RF) signal processing circuit (RFIC) 3.

The RFIC 3 is an RF signal processing circuit that processes radio-frequency signals transmitted and received by the antenna 2. Specifically, the RFIC 3 performs, through down-conversion or the like, signal processing on a reception signal input through a reception path of the radio-frequency module 1 and outputs a reception signal generated through the signal processing to a baseband signal processing circuit (not illustrated). Furthermore, the RFIC 3 performs, through up-conversion or the like, signal processing on a transmission signal input from the baseband signal processing circuit and outputs a transmission signal generated through the signal processing to a transmission path of the radio-frequency module 1.

Furthermore, the RFIC 3 also has a function of a control unit that controls connections of switches 31, 32, 33, and 34 included in the radio-frequency module 1 in accordance with information, such as a communication band (frequency band) that is used. Specifically, the RFIC 3 switches connections of the switches 31 to 34 included in the radio-frequency module 1 in accordance with a control signal. Specifically, the RFIC 3 outputs digital control signals for controlling the switches 31 to 34 to a control circuit 40 through a control signal terminal 130. A switch control circuit 41 of the control circuit 40 outputs, in accordance with digital control signals input from the RFIC 3, digital control signals to the switches 31 to 34, and thereby controls connections and disconnections of the switches 31 to 34.

Furthermore, the RFIC 3 also has a function of the control unit that controls the gain of a power amplifier 10 included in the radio-frequency module 1, and a power-supply voltage Vcc and a bias voltage Vbias that are supplied to the power amplifier 10. Specifically, the RFIC 3 outputs digital control signals to the control circuit 40 through the control signal terminal 130. A PA control circuit 42 of the control circuit 40 outputs, in accordance with digital control signals input from the RFIC 3, a control signal and a power-supply voltage Vcc or bias voltage Vbias to the power amplifier 10, and thereby adjusts the gain of the power amplifier 10. Incidentally, a control signal terminal that receives, from the RFIC 3, digital control signals for controlling the switches 31 to 34, a control signal terminal that receives, from the RFIC 3, digital control signals for controlling the gain of the power amplifier 10, and a control signal terminal that receives, from the RFIC 3, digital control signals for controlling a power-supply voltage Vcc and a bias voltage Vbias that are supplied to the power amplifier 10 may differ from one another. Furthermore, the control unit may be provided outside the RFIC 3.

The antenna 2 is connected to an antenna connection terminal 100 of the radio-frequency module 1 and emits a radio-frequency signal output from the radio-frequency module 1. Furthermore, the antenna 2 receives a radio-frequency signal from the outside and outputs the radio-frequency signal to the radio-frequency module 1.

Incidentally, in the communication device 5 according to the present embodiment, the antenna 2 is not an indispensable component.

Next, a detailed configuration of the radio-frequency module 1 will be described.

As illustrated in FIG. 1, the radio-frequency module 1 includes the antenna connection terminal 100, transmission input terminals 111 and 112, a reception output terminal 120, the control signal terminal 130, the power amplifier 10, a low noise amplifier 20, the control circuit 40, transmission filters 61T and 62T, reception filters 61R and 62R, matching networks 51 and 52, and the switches 31, 32, 33, and 34.

The antenna connection terminal 100 is connected to the antenna 2.

The power amplifier 10 is a transmission amplifier capable of amplifying radio-frequency signals in a communication band A and a communication band B input from the transmission input terminals 111 and 112. Incidentally, the radio-frequency module 1 may include, in place of the power amplifier 10, a first power amplifier that amplifies a radio-frequency signal in the communication band A and a second power amplifier that amplifies a radio-frequency signal in the communication band B.

The control circuit 40 includes the switch control circuit 41 and the PA control circuit 42. The control circuit 40 includes a logic circuit for generating control signals that control the switches 31 to 34 and the power amplifier 10 in accordance with digital control signals input through the control signal terminal 130.

The switch control circuit 41 controls connections and disconnections of the switches 31 to 34 in accordance with digital control signals input through the control signal terminal 130.

The PA control circuit 42 is an example of an amplifier control circuit. The PA control circuit 42 adjusts the gain of the power amplifier 10 in accordance with digital control signals input through the control signal terminal 130. Incidentally, the PA control circuit 42 may include a bias supply circuit that generates a bias signal that is supplied to the power amplifier 10.

The low noise amplifier 20 is a reception amplifier that is capable of amplifying radio-frequency signals in the communication bands A and B with low noise and that outputs the radio-frequency signals to the reception output terminal 120. Incidentally, the radio-frequency module 1 may include a plurality of low noise amplifiers. For example, the radio-frequency module 1 may include a first low noise amplifier that amplifies a radio-frequency signal in the communication band A and a second low noise amplifier that amplifies a radio-frequency signal in the communication band B.

Each of the power amplifier 10 and the low noise amplifier 20 is constituted, for example, by a field effect transistor (FET) or heterojunction bipolar transistor (HBT) made of a silicon (Si)-based complementary metal oxide semiconductor (CMOS) or gallium arsenide (GaAs) material.

The transmission filter 61T is disposed in a transmission path connecting the transmission input terminals 111 and 112 with the antenna connection terminal 100 and passes, of transmission signals amplified by the power amplifier 10, a transmission signal in a transmission band of the communication band A. Furthermore, the transmission filter 62T is disposed in a transmission path connecting the transmission input terminals 111 and 112 with the antenna connection terminal 100 and passes, of transmission signals amplified by the power amplifier 10, a transmission signal in a transmission band of the communication band B.

The reception filter 61R is disposed in a reception path connecting the reception output terminal 120 and the antenna connection terminal 100 and passes, of reception signals input from the antenna connection terminal 100, a reception signal in a reception band of the communication band A. Furthermore, the reception filter 62R is disposed in a reception path connecting the reception output terminal 120 and the antenna connection terminal 100 and passes, of reception signals input from the antenna connection terminal 100, a reception signal in a reception band of the communication band B.

The transmission filter 61T and the reception filter 61R constitute a duplexer 61 whose pass band is the communication band A. The duplexer 61 transmits a transmission signal and a reception signal in the communication band A by using a frequency division duplex (FDD) scheme. Furthermore, the transmission filter 62T and the reception filter 62R constitute a duplexer 62 whose pass band is the communication band B. The duplexer 62 transmits a transmission signal and a reception signal in the communication band B by using the FDD scheme.

Incidentally, each of the duplexers 61 and 62 may be a multiplexer including only a plurality of transmission filters, a multiplexer including only a plurality of reception filters, or a multiplexer including a plurality of duplexers. Furthermore, the transmission filter 61T and the reception filter 61R do not have to constitute the duplexer 61. Alternatively, one filter may be provided that performs transmission by using a time division duplex (TDD) scheme. In this case, a switch for switching between transmission and reception is disposed in at least one of stages preceding and subsequent to the above-described one filter. Furthermore, similarly, the transmission filter 62T and the reception filter 62R do not have to constitute the duplexer 62. Alternatively, one filter may be provided that performs transmission by using the TDD scheme.

Furthermore, each of the transmission filters 61T and 62T and the reception filters 61R and 62R may be, for example, any of an acoustic wave filter using a surface acoustic wave (SAW), an acoustic wave filter using a bulk acoustic wave (BAW), an LC resonant filter, and a dielectric filter, and is further not limited to these.

The matching network 51 is an example of an impedance matching network. The matching network 51 is disposed in a transmission path connecting the power amplifier 10 and the switch 32 and provides impedance matching between the power amplifier 10 and the switch 32 and duplexers 61 and 62. The matching network 52 is disposed in a reception path connecting the low noise amplifier 20 and the switch 34 and provides impedance matching between the low noise amplifier 20 and the switch 34 and duplexers 61 and 62.

The switch 31 is an example of a first switch connected to an input terminal of the power amplifier 10 and includes a common terminal 31a and selection terminals 31b and 31c. The common terminal 31a is connected to the input terminal of the power amplifier 10. The selection terminal 31b is connected to the transmission input terminal 111, and the selection terminal 31c is connected to the transmission input terminal 112. In this connection configuration, the switch 31 switches between a connection between the power amplifier 10 and the transmission input terminal 111 and a connection between the power amplifier 10 and the transmission input terminal 112. The switch 31 is constituted, for example, by a single pole double throw (SPDT) switch circuit.

From the transmission input terminal 111, for example, a transmission signal in the communication band A is input. From the transmission input terminal 112, for example, a transmission signal in the communication band B is input. Incidentally, from the transmission input terminal 111, for example, a transmission signal in the communication band A or B in the fourth generation mobile communication system (4G) may be input, and, from the transmission input terminal 112, for example, a transmission signal in the communication band A or B in the fifth generation mobile communication system (5G) may be input.

Furthermore, the switch 31 may have a configuration in which the common terminal 31a is connected to one transmission input terminal, in which the selection terminal 31b is connected to the first power amplifier that amplifies a transmission signal in the communication band A, and in which the selection terminal 31c is connected to the second power amplifier that amplifies a transmission signal in the communication band B.

Furthermore, the switch 31 may be constituted by a double pole double throw (DPDT) switch circuit including two common terminals and two selection terminals. In this case, the transmission input terminal 111 is connected to one common terminal, and the transmission input terminal 112 is connected to the other common terminal. Furthermore, one selection terminal is connected to the first power amplifier that amplifies a transmission signal in the communication band A, and the other selection terminal is connected to the second power amplifier that amplifies a transmission signal in the communication band B. In this connection configuration, the switch 31 switches between a connection between the one common terminal and the one selection terminal and a connection between the one common terminal and the other selection terminal, and also switches between a connection between the other common terminal and the one selection terminal and a connection between the other common terminal and the other selection terminal.

In this case, for example, a transmission signal in the communication band A is input from the transmission input terminal 111, and a transmission signal in the communication band B is input from the transmission input terminal 112. Furthermore, for example, transmission signals in the communication band A and the communication band B in 4G may be input from the transmission input terminal 111, and transmission signals in the communication band A and the communication band B in 5G may be input from the transmission input terminal 112.

The switch 32 is an example of a second switch connected to an output terminal of the power amplifier 10 through the matching network 51 and includes a common terminal 32a and selection terminals 32b and 32c. The common terminal 32a is connected to the output terminal of the power amplifier 10 through the matching network 51. The selection terminal 32b is connected to the transmission filter 61T, and the selection terminal 32c is connected to the transmission filter 62T. In this connection configuration, the switch 32 switches between a connection and a disconnection between the power amplifier 10 and the transmission filter 61T and switches between a connection and a disconnection between the power amplifier 10 and the transmission filter 62T. The switch 32 is constituted, for example, by an SPDT switch circuit.

The switch 34 is connected to an input terminal of the low noise amplifier 20 through the matching network 52 and includes a common terminal 34a and selection terminals 34b and 34c. The common terminal 34a is connected to the input terminal of the low noise amplifier 20 through the matching network 52. The selection terminal 34b is connected to the reception filter 61R, and the selection terminal 34c is connected to the reception filter 62R. In this connection configuration, the switch 34 switches between a connection and a disconnection between the low noise amplifier 20 and the reception filter 61R and switches between a connection and a disconnection between the low noise amplifier 20 and the reception filter 62R. The switch 34 is constituted, for example, by an SPDT switch circuit.

The switch 33 is an example of an antenna switch that switches between a connection and a disconnection between the antenna connection terminal 100 and the duplexer 61 and also switches between a connection and a disconnection between the antenna connection terminal 100 and the duplexer 62. The switch 33 includes a common terminal 33a and selection terminals 33b and 33c. The common terminal 33a is connected to the antenna connection terminal 100, the selection terminal 33b is connected to the duplexer 61, and the selection terminal 33c is connected to the duplexer 62. The switch 33 is constituted, for example, by an SPDT switch circuit.

Incidentally, the numbers of common terminals and selection terminals included in the switches 31 to 34 are appropriately set in accordance with the number of signal paths included in the radio-frequency module 1.

The switches 31 and 32 and the switch control circuit 41 are included in a first semiconductor integrated circuit (IC) being integrated into a single chip. The first semiconductor IC is constructed, for example, by CMOS. Specifically, the first semiconductor IC is formed by a silicon-on-insulator (SOI) process. Thus, the first semiconductor IC can be fabricated inexpensively. Incidentally, the first semiconductor IC may be made of at least any of GaAs, silicon germanium (SiGe), and gallium nitride (GaN). Thus, in the case where the first semiconductor IC includes an amplifier, a radio-frequency signal having high-quality amplification performance and noise performance can be output.

Furthermore, the low noise amplifier 20 and the switch 34 may be formed in a second semiconductor IC being integrated into a single chip. Additionally, the first semiconductor IC and the second semiconductor IC may be included in a third semiconductor IC being integrated into a single chip.

In the configuration of the radio-frequency module 1, the switch 31, the power amplifier 10, the matching network 51, the switch 32, the transmission filter 61T, and the switch 33 constitute a first transmission circuit that transmits a transmission signal in the communication band A toward the antenna connection terminal 100. Furthermore, the switch 33, the reception filter 61R, the switch 34, the matching network 52, and the low noise amplifier 20 constitute a first reception circuit that transmits a reception signal in the communication band A from the antenna 2 through the antenna connection terminal 100. Additionally, the switch 31, the power amplifier 10, the matching network 51, the switch 32, the transmission filter 62T, and the switch 33 constitute a second transmission circuit that transmits a transmission signal in the communication band B toward the antenna connection terminal 100. Besides, the switch 33, the reception filter 62R, the switch 34, the matching network 52, and the low noise amplifier 20 constitute a second reception circuit that transmits a reception signal in the communication band B from the antenna 2 through the antenna connection terminal 100.

In the above-described circuit configuration, the radio-frequency module 1 can perform at least any of transmission, reception, and transmission and reception of a radio-frequency signal or signals in the communication band A or communication band B. Furthermore, the radio-frequency module 1 can also perform at least any of simultaneous transmission, simultaneous reception, and simultaneous transmission and reception of radio-frequency signals in the communication band A and the communication band B.

Incidentally, in a radio-frequency module according to the present invention, the above-described two transmission circuits and the above-described two reception circuits do not have to be connected to the antenna connection terminal 100 through the switch 33. The above-described two transmission circuits and the above-described two reception circuits may be connected to the antenna 2 through a different terminal.

Incidentally, a radio-frequency module according to the present invention only has to include, of circuit components of the radio-frequency module 1 illustrated in FIG. 1, at least the power amplifier 10, at least the switches 31 and 32, and at least the switch control circuit 41.

Here, in the case where the radio-frequency module 1 is miniaturized, a signal path on an input side of the power amplifier 10 and a signal path on an output side come close to each other, and thus it is likely that isolation between these two signal paths deteriorates. When isolation between the above-described two signal paths deteriorates, an unwanted radio-frequency signal feedback loop is formed between an input and an output of the power amplifier 10. In this case, the power amplifier 10 oscillates under certain conditions, resulting in unstable operation thereof. On the other hand, a configuration of the radio-frequency module 1 in which oscillation of the power amplifier 10 is reduced and that is small-sized will be described below.

Figure 2A:
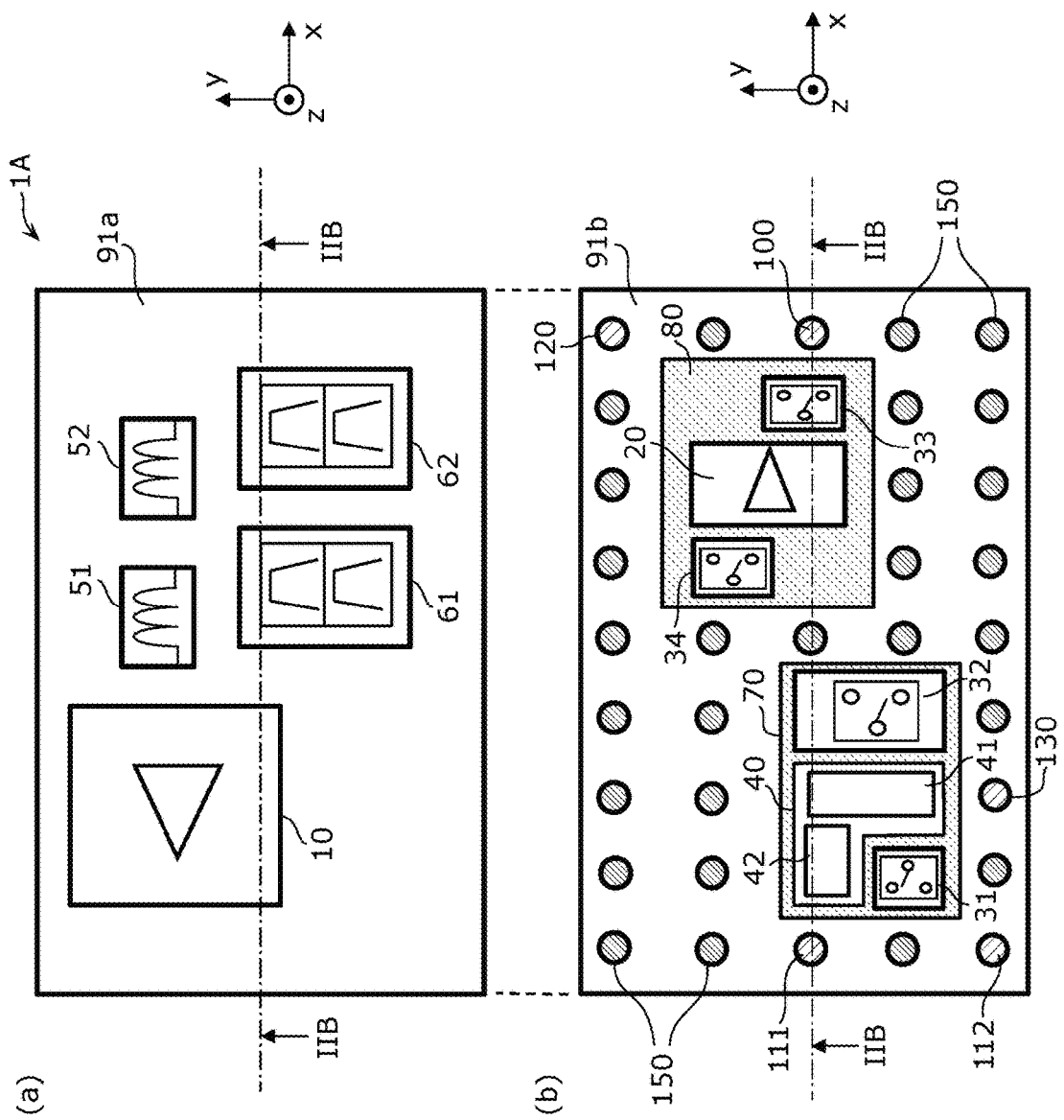
FIG. 2A is a schematic diagram of a planar configuration of a radio-frequency module according to a practical example.
Figure 2B:
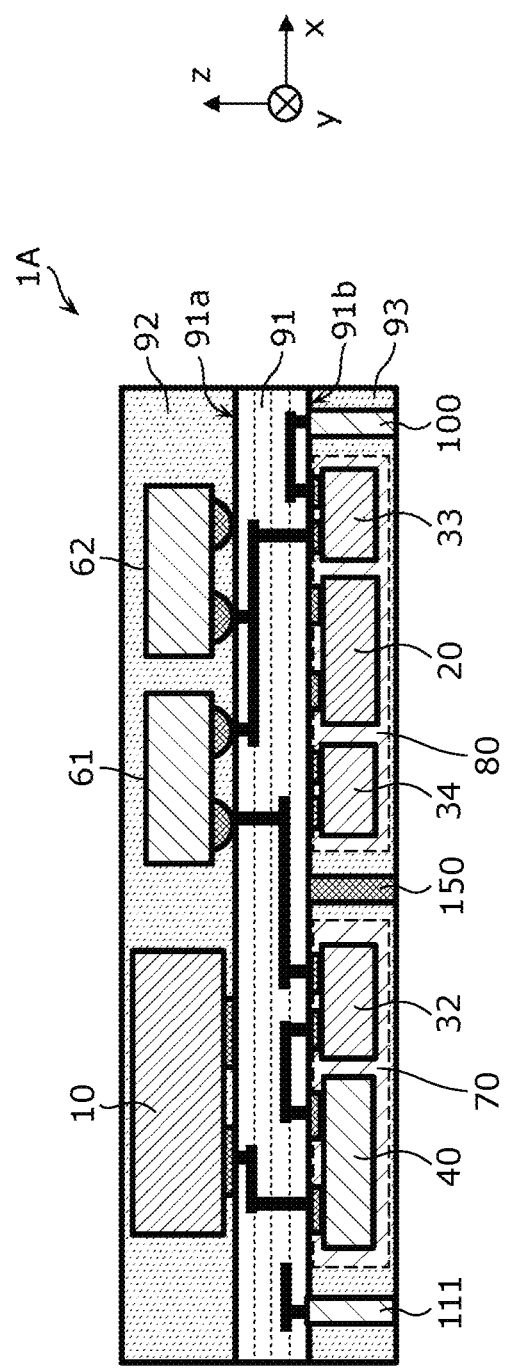
FIG. 2B is a schematic diagram of a cross-sectional configuration of the radio-frequency module according to the practical example.

2. Layout of Circuit Elements in Radio-Frequency Module 1A According to Practical Example FIG. 2A is a schematic diagram of a planar configuration of a radio-frequency module 1A according to a practical example. Furthermore, FIG. 2B is a schematic diagram of a cross-sectional configuration of the radio-frequency module 1A according to the practical example, specifically, a cross-sectional diagram taken along line IIB-IIB in FIG. 2A. Incidentally, (a) of FIG. 2A illustrates a layout diagram of circuit elements when, of main surfaces 91a and 91b on opposite sides of a module substrate 91, the main surface 91a is viewed from a positive side of a z axis. On the other hand, (b) of FIG. 2A illustrates the layout of circuit elements as seen through the main surface 91b when the main surface 91b is viewed from the positive side of the z axis.

The diagram of the radio-frequency module 1A according to the practical example specifically illustrates the layout of circuit elements constituting the radio-frequency module 1 according to the embodiment.

As illustrated in FIGS. 2A and 2B, the radio-frequency module 1A according to the present practical example further includes the module substrate 91, resin members 92 and 93, and external connection terminals 150 in addition to the circuit configuration illustrated in FIG. 1.

The module substrate 91 has the main surface 91a (first main surface) and the main surface 91b (second main surface) opposite to each other and is a substrate where the above-described transmission circuits and the above-described reception circuits are mounted. As the module substrate 91, for example, a low temperature co-fired ceramic (LTCC) substrate having a stacked structure including a plurality of dielectric layers, a high temperature co-fired ceramic (HTCC) substrate, a substrate with a built-in component, a substrate with a redistribution layer (RDL), or a printed circuit substrate is used.

The resin member 92 is disposed on the main surface 91a of the module substrate 91 and covers part of the above-described transmission circuits, part of the above-described reception circuits, and the main surface 91a of the module substrate 91. The resin member 92 has a function of ensuring the reliability of, for example, the mechanical strength and moisture resistance of circuit elements constituting the above-described transmission circuits and the above-described reception circuits. The resin member 93 is disposed on the main surface 91b of the module substrate 91 and covers part of the above-described transmission circuits, part of the above-described reception circuits, and the main surface 91b of the module substrate 91. The resin member 93 has a function of ensuring the reliability of, for example, the mechanical strength and moisture resistance of circuit elements constituting the above-described transmission circuits and the above-described reception circuits. Incidentally, the resin members 92 and 93 are not indispensable components to a radio-frequency module according to the present invention.

As illustrated in FIGS. 2A and 2B, in the radio-frequency module 1A according to the present practical example, the power amplifier 10, the duplexers 61 and 62, and the matching networks 51 and 52 are disposed on or above the main surface 91a (first main surface). On the other hand, the control circuit 40, the switches 31 to 34, and the low noise amplifier 20 are disposed on or above the main surface 91b (second main surface).

Incidentally, although not illustrated in FIG. 2A, lines constituting a transmission path and a reception path that connect circuit components illustrated in FIG. 1 are formed within the module substrate 91 and on the main surfaces 91a and 91b. Furthermore, each of the above-described lines may be a bonding wire with each end bonded to any of the main surfaces 91a and 91b and a circuit element constituting the radio-frequency module 1A, or alternatively may be a terminal, electrode, or line formed on a surface of a circuit element constituting the radio-frequency module 1A.

Here, as illustrated in (b) of FIG. 2A, the switches 31 and 32 and the control circuit 40 are included in a semiconductor IC 70 being integrated into a single chip (also referred to as a die). Incidentally, a situation in which a plurality of circuit elements are included in a semiconductor IC being integrated into a single chip is defined as a situation in which the plurality of circuit elements are formed on a surface of or within one semiconductor substrate, or a situation in which the plurality of circuit elements are integrally disposed in a single package. Furthermore, the above-described one semiconductor substrate and the above-described single package differ from the module substrate 91 and further differ from an external substrate where the radio-frequency module 1A is mounted.

Furthermore, as illustrated in (b) of FIG. 2A, when the module substrate 91 is viewed in a plan view, in the semiconductor IC 70, the control circuit 40 is disposed between the switch 31 and the switch 32.

In the above-described configuration, the switches 31 and 32 and the control circuit 40 are formed in the semiconductor IC 70 being integrated into the single chip, thus making it possible to promote miniaturization of the radio-frequency module 1A. Furthermore, the switch 31 disposed in the signal path on the input side of the power amplifier 10 and the switch 32 disposed in the signal path on the output side are separated by the control circuit 40, and thus electromagnetic field coupling between the switch 31 and the switch 32 can be reduced. Furthermore, the length of a control line connecting the switch 31 and the switch control circuit 41 and the length of a control line connecting the switch 32 and the switch control circuit 41 can be reduced, and thus electromagnetic field coupling between these two control lines can be reduced. Hence, deterioration of isolation between the signal path on the input side of the power amplifier 10 and the signal path on the output side is inhibited, and thus the power amplifier 10 can be kept from oscillating due to formation of an unwanted radio-frequency signal feedback loop between the input and the output of the power amplifier 10. Furthermore, not only the switch control circuit 41 but also the PA control circuit 42 is built in the semiconductor IC 70, and thus a distance between the switch 31 and the switch 32 can be increased further.

Furthermore, the radio-frequency module 1A exchanges electrical signals with the external substrate disposed on a negative z-axis side of the radio-frequency module 1A through the external connection terminals 150. As illustrated in (b) of FIG. 2A, included among the external connection terminals 150 are the antenna connection terminal 100, the transmission input terminals 111 and 112, the reception output terminal 120, and the control signal terminal 130. Furthermore, some of the external connection terminals 150 are set at a ground potential of the external substrate.

Of the main surfaces 91a and 91b, on or above the main surface 91b opposite to the external substrate, the power amplifier 10 that is difficult to reduce in height is not disposed, but the control circuit 40, the low noise amplifier 20, and the switches 31 to 34 that are easy to reduce in height are disposed, thus enabling a reduction in the height of the entire radio-frequency module 1A. Furthermore, around the low noise amplifier 20 that greatly affects reception sensitivity of the reception circuits, a plurality of external connection terminals 150 used as ground electrodes are disposed, thus making it possible to inhibit deterioration of reception sensitivity of the reception circuits.

Furthermore, in the radio-frequency module 1A, the power amplifier 10 is disposed on or above the main surface 91a. The power amplifier 10 is a component that generates the largest amount of heat of circuit components included in the radio-frequency module 1A. To improve heat dissipation of the radio-frequency module 1A, it is desirable to dissipate heat generated by the power amplifier 10 to the external substrate by using a heat dissipation path with a small thermal resistance. If the power amplifier 10 is mounted on or above the main surface 91b, an electrode line connected to the power amplifier 10 is disposed on the main surface 91b. For this reason, as a heat dissipation path, a heat dissipation path extending only through a planar wiring pattern (along an x-y planar direction) on the main surface 91b is included. The above-described planar wiring pattern is formed from a thin metal film and thus has a large thermal resistance. As a result, when the power amplifier 10 is disposed on the main surface 91b, heat dissipation is reduced.

On the other hand, when the power amplifier 10 is disposed on or above the main surface 91a, the power amplifier 10 and the external substrate can be connected to each other through a ground via conductor extending between the main surface 91a and the main surface 91b. Thus, as a heat dissipation path of the power amplifier 10, a heat dissipation path extending only through the planar wiring pattern that has a large thermal resistance and extends along the x-y planar direction can be excluded. Hence, the radio-frequency module 1A in which heat dissipation from the power amplifier 10 to the external substrate is improved and that is small-sized can be provided.

Furthermore, in the radio-frequency module 1A according to the present practical example, the low noise amplifier 20 is disposed on or above the main surface 91b.

Thus, the power amplifier 10 that amplifies a transmission signal and the low noise amplifier 20 that amplifies a reception signal are disposed separately on or above both the respective surfaces of the module substrate 91, therefore improving isolation between transmission and reception.

Incidentally, the module substrate 91 has a multilayer structure in which a plurality of dielectric layers are stacked on top of one another, and it is desirable that a ground electrode pattern is formed in at least one of the plurality of dielectric layers. This improves an electromagnetic field shielding function of the module substrate 91.

Furthermore, in the radio-frequency module 1A according to the present practical example, the matching network 51 is disposed on or above the main surface 91a. The matching network 51 includes an inductor.

Thus, the switch 31 disposed in the signal path on the input side of the power amplifier 10 and the matching network 51 disposed in the signal path on the output side are disposed separately on or above the respective main surfaces 91b and 91a of the module substrate 91, and electromagnetic field coupling between the switch 31 and the matching network 51 can therefore be reduced. Hence, deterioration of isolation between the signal path on the input side of the power amplifier 10 and the signal path on the output side is inhibited further.

Furthermore, the low noise amplifier 20 and the switches 33 and 34 are included in a single semiconductor IC 80. Thus, the semiconductor ICs 70 and 80 that are easy to reduce in height are disposed on the main surface 91b, therefore enabling a reduction in the height of the entire radio-frequency module 1A.

Incidentally, the semiconductor IC 70 and the semiconductor IC 80 may be integrated into a single semiconductor IC. Furthermore, the semiconductor IC 70 may include at least one of the low noise amplifier 20 and the switches 33 and 34.

Incidentally, in the radio-frequency module 1A according to the present practical example, the power amplifier 10, the duplexers 61 and 62, and the matching networks 51 and 52 are disposed on or above the main surface 91a, and the control circuit 40, the switches 31 to 34, and the low noise amplifier 20 are disposed on or above the main surface 91b. However, in a radio-frequency module according to the present invention, the above-described circuit elements may be disposed on or above any main surface, or alternatively may be formed within the module substrate 91.

Incidentally, in the radio-frequency module 1A, the external connection terminals 150 may be columnar electrodes extending through the resin member 93 in a z-axis direction as illustrated in FIG. 2B. Alternatively, as in a radio-frequency module 1B according to a modification to be described, external connection terminals may be bump electrodes formed on the main surface 91b. In this case, the resin member 93 on a main surface 91b side does not have to be provided.

Figure 3A:
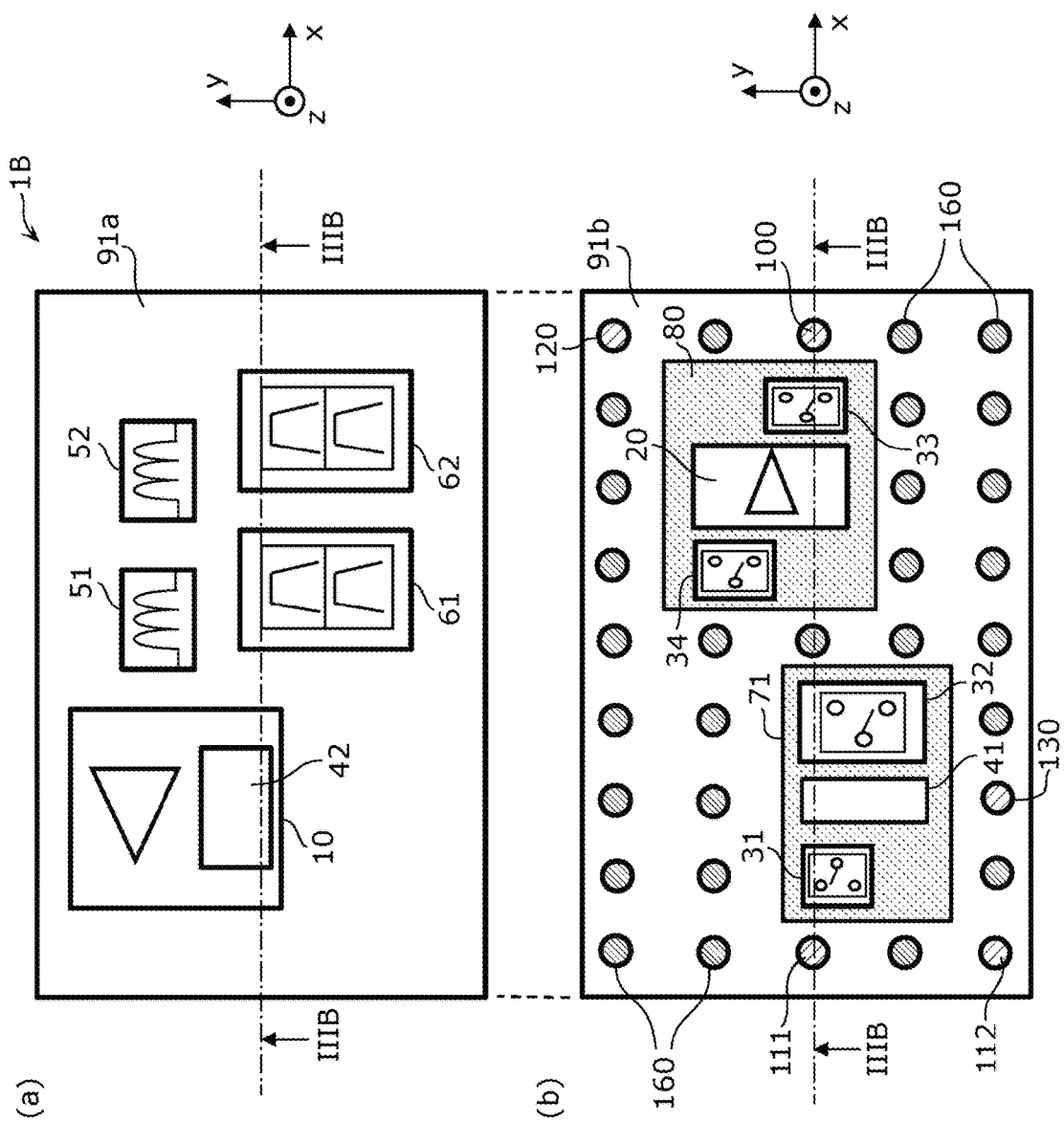
FIG. 3A is a schematic diagram of a planar configuration of a radio-frequency module according to a modification.
Figure 3B:
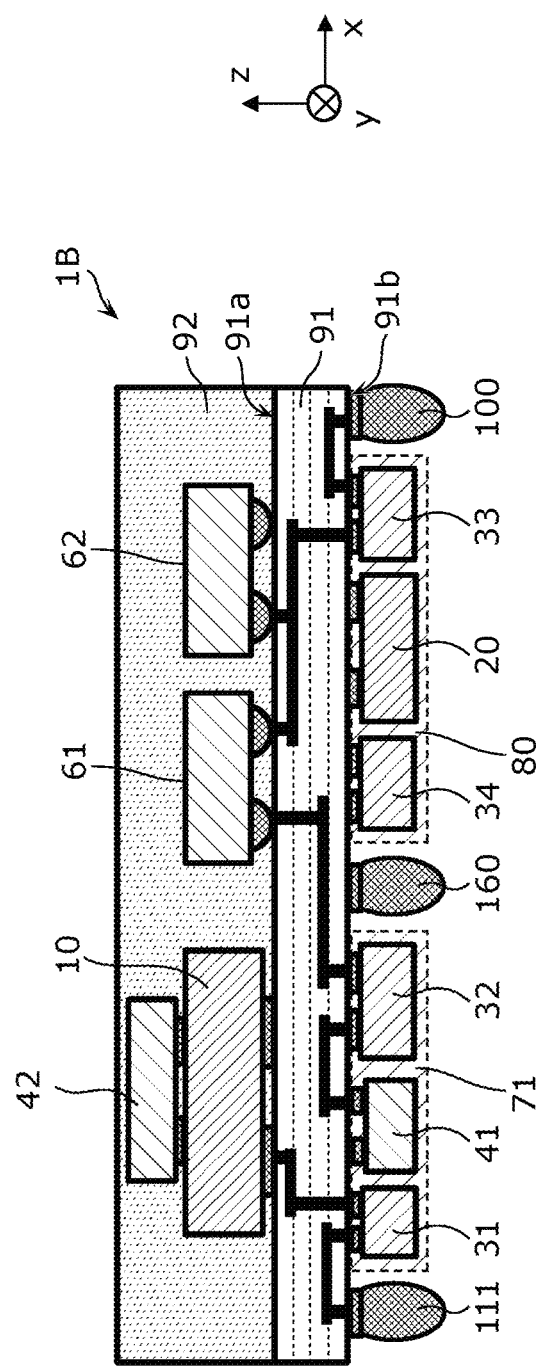
FIG. 3B is a schematic diagram of a cross-sectional configuration of the radio-frequency module according to the modification.

3. Layout of Circuit Elements in Radio-Frequency Module 1B According to Modification FIG. 3A is a schematic diagram of a planar configuration of the radio-frequency module 1B according to a modification. Furthermore, FIG. 3B is a schematic diagram of a cross-sectional configuration of the radio-frequency module 1B according to the modification, specifically, a cross-sectional diagram taken along line IIIB-IIIB in FIG. 3A. Incidentally, (a) of FIG. 3A illustrates a layout diagram of circuit elements when, of the main surfaces 91a and 91b opposite to each other of the module substrate 91, the main surface 91a is viewed from a positive side of a z axis. On the other hand, (b) of FIG. 3A illustrates the layout of circuit elements as seen through the main surface 91b when the main surface 91b is viewed from the positive side of the z axis.

The diagram of the radio-frequency module 1B according to the modification specifically illustrates the layout of circuit elements constituting the radio-frequency module 1 according to the embodiment.

The radio-frequency module 1B according to the present modification differs from the radio-frequency module 1A according to the practical example in the placement of the PA control circuit 42. With respect to the radio-frequency module 1B according to the present modification, a description of things in common with the radio-frequency module 1A according to the practical example is omitted, and a description will be given below with emphasis on respects in which the radio-frequency module 1B differs from the radio-frequency module 1A.

As illustrated in FIGS. 3A and 3B, the radio-frequency module 1B according to the present modification further includes the module substrate 91, the resin member 92, and bump electrodes 160 in addition to the circuit configuration illustrated in FIG. 1.

As illustrated in FIGS. 3A and 3B, in the radio-frequency module 1B according to the present modification, the power amplifier 10, the PA control circuit 42, the duplexers 61 and 62, and the matching networks 51 and 52 are disposed on or above the main surface 91a (first main surface). On the other hand, the switch control circuit 41, the switches 31 to 34, and the low noise amplifier 20 are disposed on or above the main surface 91b (second main surface).

Here, as illustrated in (b) of FIG. 3A, the switches 31 and 32 and the switch control circuit 41 are included in a semiconductor IC 71 being integrated into a single chip.

Furthermore, as illustrated in (b) of FIG. 3A, when the module substrate 91 is viewed in a plan view, in the semiconductor IC 71, the switch control circuit 41 is disposed between the switch 31 and the switch 32.

In the above-described configuration, the switches 31 and 32 and the switch control circuit 41 are formed in the semiconductor IC 71 being integrated into the single chip, thus making it possible to promote miniaturization of the radio-frequency module 1B. Furthermore, the switch 31 disposed in the signal path on the input side of the power amplifier 10 and the switch 32 disposed in the signal path on the output side are separated by the switch control circuit 41, and thus electromagnetic field coupling between the switch 31 and the switch 32 can be reduced. Furthermore, the length of the control line connecting the switch 31 and the switch control circuit 41 and the length of the control line connecting the switch 32 and the switch control circuit 41 can be reduced, and thus electromagnetic field coupling between these two control lines can be reduced. Hence, deterioration of isolation between the signal path on the input side of the power amplifier 10 and the signal path on the output side is inhibited, and thus the power amplifier 10 can be kept from oscillating due to formation of an unwanted radio-frequency signal feedback loop between the input and the output of the power amplifier 10.

Furthermore, in the radio-frequency module 1B, the PA control circuit 42 and the power amplifier 10 are stacked on or above the main surface 91a.

Thus, the PA control circuit 42 and the power amplifier 10 are disposed in a stacked manner, therefore making it possible to promote miniaturization of the radio-frequency module 1B. Furthermore, a temperature differential between the power amplifier 10 and the PA control circuit 42 can be reduced. For this reason, the power amplifier 10 and the PA control circuit 42 are disposed in the same temperature environment, and thus accuracy of response of the power amplifier 10 that is controlled by the PA control circuit 42 to operate can be increased. Thus, amplification characteristics of the power amplifier 10 can be controlled with high accuracy by the PA control circuit 42, and the amplification characteristics can therefore be optimized. Hence, deterioration of output characteristics of the power amplifier 10 can be inhibited.

Furthermore, the radio-frequency module 1B exchanges electrical signals with the external substrate disposed on a negative z-axis side of the radio-frequency module 1B through the bump electrodes 160. The bump electrodes 160 are an example of an external connection terminal. As illustrated in (b) of FIG. 3A, included among the bump electrodes 160 are the antenna connection terminal 100, the transmission input terminals 111 and 112, the reception output terminal 120, and the control signal terminal 130. Furthermore, some of the bump electrodes 160 are set at a ground potential of the external substrate.

Of the main surfaces 91a and 91b, on or above the main surface 91b opposite to the external substrate, the power amplifier 10 that is difficult to reduce in height is not disposed, but the switch control circuit 41, the low noise amplifier 20, and the switches 31 to 34 that are easy to reduce in height are disposed, thus enabling a reduction in the height of the entire radio-frequency module 1B.

Incidentally, the semiconductor IC 71 and the semiconductor IC 80 may be integrated into a single semiconductor IC. Furthermore, the semiconductor IC 71 may include at least one of the low noise amplifier 20 and the switches 33 and 34.

Incidentally, in the radio-frequency module 1B according to the present modification, the power amplifier 10, the PA control circuit 42, the duplexers 61 and 62, and the matching networks 51 and 52 are disposed on or above the main surface 91a, and the switch control circuit 41, the switches 31 to 34, and the low noise amplifier 20 are disposed on or above the main surface 91b. However, in a radio-frequency module according to the present invention, the above-described circuit elements may be disposed on or above any main surface, or alternatively may be formed within the module substrate 91.

Incidentally, in the radio-frequency module 1B, the bump electrodes 160 may be columnar electrodes extending through the resin member 93 in a z-axis direction as in the radio-frequency module 1A according to the practical example.

4. Effects

As described above, the radio-frequency module 1 according to the present embodiment includes the module substrate 91; the power amplifier 10; the switch 31 connected to the input terminal of the power amplifier 10; the switch 32 connected to the output terminal of the power amplifier 10; and the switch control circuit 41 that controls the switches 31 and 32. The switches 31 and 32 and the switch control circuit 41 are included in the semiconductor IC 70 being integrated into a single chip. The power amplifier 10 and the semiconductor IC 70 are mounted on or above the module substrate 91. When the module substrate 91 is viewed in a plan view, in the semiconductor IC 70, the switch control circuit 41 is disposed between the switch 31 and the switch 32.

In the above-described configuration, the switches 31 and 32 and the control circuit 40 are formed in the semiconductor IC 70 being integrated into the single chip, thus making it possible to promote miniaturization of the radio-frequency module 1. Furthermore, the switch 31 and the switch 32 are separated by the switch control circuit 41, and thus electromagnetic field coupling between the switch 31 and the switch 32 can be reduced. Furthermore, the length of the control line connecting the switch 31 and the switch control circuit 41 and the length of the control line connecting the switch 32 and the switch control circuit 41 can be reduced, and thus electromagnetic field coupling between these two control lines can be reduced. Hence, deterioration of isolation between the signal path on the input side of the power amplifier 10 and the signal path on the output side is inhibited, and thus the power amplifier 10 can be kept from oscillating due to formation of an unwanted radio-frequency signal feedback loop between the input and the output of the power amplifier 10.

Furthermore, in the radio-frequency module 1, the module substrate 91 may have the main surfaces 91a and 91b opposite to each other. The radio-frequency module 1 may further include an external connection terminal 150 disposed on the main surface 91b. The semiconductor IC 70 may be disposed on the main surface 91b.

Thus, the switch control circuit 41 and the switches 31 and 32 that are easy to reduce in height are disposed on or above the main surface 91b, therefore enabling a reduction in the height of the entire radio-frequency module 1.

Furthermore, in the radio-frequency module 1, the power amplifier 10 may be disposed on or above the main surface 91a.

Thus, the power amplifier 10 and the external substrate can be connected to each other through a ground via conductor extending between the main surface 91a and the main surface 91b, and, as a heat dissipation path of the power amplifier 10, a heat dissipation path extending only through a planar wiring pattern that has a large thermal resistance and extends along an x-y planar direction can be excluded. Hence, the radio-frequency module 1 in which heat dissipation from the power amplifier 10 to the external substrate is improved and that is small-sized can be provided.

Furthermore, the radio-frequency module 1 may further include the low noise amplifier 20, and the low noise amplifier 20 may be disposed on or above the main surface 91b.

Thus, the power amplifier 10 that amplifies a transmission signal and the low noise amplifier 20 that amplifies a reception signal are disposed separately on or above both the respective surfaces of the module substrate 91, therefore improving isolation between transmission and reception.

Furthermore, the radio-frequency module 1A may further include the PA control circuit 42 that controls the power amplifier 10, and the PA control circuit 42 may be included in the semiconductor IC 70. When the module substrate 91 is viewed in a plan view, in the semiconductor IC 70, the switch control circuit 41 and the PA control circuit 42 may be disposed between the switch 31 and the switch 32.

Thus, not only the switch control circuit 41 but also the PA control circuit 42 is built in the semiconductor IC 70, and a distance between the switch 31 and the switch 32 can therefore be increased further.

Furthermore, the radio-frequency module 1B may further include the PA control circuit 42 that controls the power amplifier 10, and the power amplifier 10 and the PA control circuit 42 may be stacked on or above the main surface 91*a*.

Thus, the PA control circuit 42 and the power amplifier 10 are disposed in a stacked manner, therefore making it possible to promote miniaturization of the radio-frequency module 1B. Furthermore, a temperature differential between the power amplifier 10 and the PA control circuit 42 can be reduced. Thus, amplification characteristics of the power amplifier 10 can be controlled with high accuracy by the PA control circuit 42, and the amplification characteristics can therefore be optimized. Hence, deterioration of output characteristics of the power amplifier 10 can be inhibited.

Furthermore, the radio-frequency module 1 may further include the matching network 51 connected between the output terminal of the power amplifier 10 and the switch 32. The matching network 51 may include an inductor, and the inductor may be disposed on or above the main surface 91*a*.

Thus, the switch 31 and the matching network 51 are disposed separately on or above the respective main surfaces 91*b* and 91*a* of the module substrate 91, and electromagnetic field coupling between the switch 31 and the matching network 51 can therefore be reduced. Hence, deterioration of isolation between the signal path on the input side of the power amplifier 10 and the signal path on the output side is inhibited further.

Furthermore, the communication device 5 includes the antenna 2; the RFIC 3 that processes radio-frequency signals transmitted and received by the antenna 2; and the radio-frequency module 1 that transmits the radio-frequency signals between the antenna 2 and the RFIC 3.

Thus, the communication device 5 in which unstable operation of the power amplifier 10 is suppressed and that is small-sized can be provided.

Other Embodiments

Although a radio-frequency module and a communication device according to an embodiment of the present invention have been described above by taking an embodiment, a practical example, and a modification, a radio-frequency module and a communication device according to the present invention are not limited to the above-described embodiment, practical example, and modification. The present invention also covers another embodiment achieved by combining any components in the above-described embodiment, practical example, and modification, modifications obtained by making various modifications conceived by a person skilled in the art to the above-described embodiment, practical example, and modification within the scope of the gist of the present invention, and various devices including the above-described radio-frequency modules and communication device.

For example, in the radio-frequency modules and the communication device according to the above-described embodiment, practical example, and modification, between paths connecting circuit elements and signal paths that are illustrated in the drawings, another circuit element, a line, and so forth may be inserted.

The present invention can be widely used, as a radio-frequency module disposed in a multiband front-end section, in communication equipment, such as mobile phones.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A radio-frequency module comprising:
a module substrate;
a power amplifier;
a first switch connected to an input terminal of the power amplifier;
a second switch connected to an output terminal of the power amplifier; and
a switch control circuit configured to control the first switch and the second switch, wherein
the first switch, the second switch, and the switch control circuit are included in a semiconductor integrated circuit (IC) being integrated into a single chip,
the power amplifier and the semiconductor IC are mounted on or above the module substrate, and
when the module substrate is viewed in a plan view, in the semiconductor IC, the switch control circuit is physically positioned between the first switch and the second switch in a manner that a virtual line extending from one side of the module substrate to another side of the module substrate, as viewed in the plan view, passes through the control circuit, the first switch and the second switch.

2. The radio-frequency module of claim 1, wherein
the module substrate has a first main surface and a second main surface on opposite sides of the module substrate.

3. The radio-frequency module of claim 2, further comprising:
an external connection terminal disposed on the second main surface.

4. The radio-frequency module of claim 3, wherein
the semiconductor IC is disposed on the second main surface.

5. The radio-frequency module of claim 4, wherein
the power amplifier is disposed on or above the first main surface.

6. The radio-frequency module of claim 5, further comprising:
a low noise amplifier disposed on or above the second main surface.

7. The radio-frequency module of claim 1, further comprising:
an amplifier control circuit configured to control the power amplifier.

8. The radio-frequency module of claim 7, wherein
the amplifier control circuit is included in the semiconductor IC.

9. The radio-frequency module of claim 8, wherein
when the module substrate is viewed in the plan view, in the semiconductor IC, the switch control circuit and the amplifier control circuit are disposed between the first switch and the second switch.

10. The radio-frequency module of claim 2, further comprising:
an amplifier control circuit configured to control the power amplifier, wherein
the power amplifier and the amplifier control circuit are stacked on or above the first main surface.

11. The radio-frequency module of claim 2, further comprising:

an impedance matching network connected between the output terminal of the power amplifier and the second switch.

12. The radio-frequency module of claim 11, wherein the impedance matching network includes an inductor disposed on or above the first main surface.

13. A communication device comprising:
an antenna;
a radio-frequency (RF) signal processing circuit configured to process RF signals transmitted and received by the antenna; and
a RF module configured to transmit the RF signals between the antenna and the RF signal processing circuit, wherein
the RF module includes
a module substrate;
a power amplifier;
a first switch connected to an input terminal of the power amplifier;
a second switch connected to an output terminal of the power amplifier; and
a switch control circuit configured to control the first switch and the second switch,
the first switch, the second switch, and the switch control circuit are included in a semiconductor integrated circuit (IC) being integrated into a single chip,
the power amplifier and the semiconductor IC are mounted on or above the module substrate, and
when the module substrate is viewed in a plan view, in the semiconductor IC, the switch control circuit is physically positioned between the first switch and the second switch in a manner that a virtual line extending from one side of the module substrate to another side of the module substrate, as viewed in the plan view, passes through the control circuit, the first switch and the second switch.

14. A radio-frequency module comprising:
a module substrate having a first main surface and a second main surface on opposite sides of the module substrate;
a power amplifier disposed on the first main surface;
a first switch connected to an input terminal of the power amplifier;
a second switch connected to an output terminal of the power amplifier; and
a switch control circuit configured to control the first switch and the second switch, wherein
the first switch, the second switch, and the switch control circuit are included in a semiconductor integrated circuit (IC) disposed on the second main surface.

15. The radio-frequency module of claim 14, wherein
when the module substrate is viewed in a plan view, the switch control circuit is disposed between the first switch and the second switch.

16. The radio-frequency module of claim 14, further comprising:
an external connection terminal disposed on the second main surface.

17. The radio frequency module of claim 14, further comprising:
a low noise amplifier disposed on or above the second main surface.

18. The radio frequency module of claim 14, further comprising:
an amplifier control circuit configured to control the power amplifier, wherein
the amplifier control circuit is included in the semiconductor IC, and
when the module substrate is viewed in the plan view, the switch control circuit and the amplifier control circuit are disposed between the first switch and the second switch.

19. The radio-frequency module of claim 14, further comprising:
an amplifier control circuit configured to control the power amplifier, wherein
the power amplifier and the amplifier control circuit are stacked on or above the first main surface.

20. The radio-frequency module of claim 14, further comprising:
an impedance matching network connected between the output terminal of the power amplifier and the second switch, wherein
the impedance matching network includes an inductor disposed on or above the first main surface.

* * * * *